United States Patent [19]

Augustine

[11] Patent Number: 4,644,795

[45] Date of Patent: Feb. 24, 1987

[54] HIGH RESOLUTION MULTILINE ULTRASONIC BEAMFORMER

[75] Inventor: Larry J. Augustine, Bothell, Wash.

[73] Assignee: Advanced Technology Laboratories, Inc., Bothell, Wash.

[21] Appl. No.: 759,761

[22] Filed: Jul. 29, 1985

[51] Int. Cl.⁴ .............................................. G01N 29/00
[52] U.S. Cl. ...................................... 73/625; 73/609; 73/628; 128/660; 367/62
[58] Field of Search .................... 367/62; 73/625, 596, 73/609, 626, 628; 128/660

[56] References Cited

U.S. PATENT DOCUMENTS

| | | | |
|---|---|---|---|
| 3,863,201 | 1/1975 | Briggs et al. | 367/62 |
| 4,151,504 | 4/1979 | Mayne et al. | 367/62 |
| 4,155,329 | 5/1979 | Engeler | 128/660 |
| 4,320,660 | 3/1982 | Tancrell | 73/626 |
| 4,448,076 | 5/1984 | van Heelsbergen | 73/626 |

Primary Examiner—Howard A. Birmiel
Attorney, Agent, or Firm—Lawrence S. Levinson; Sanford J. Asman

[57] ABSTRACT

The present invention is a multiline beamformer for use in a medical ultrasound scanner using a phased array transducer. Lines of ultrasound energy are generated having a pressure at the array aperture corresponding to $\sin(\pi x)/\pi x$, where x is the normalized distance of the array element measured from the center of the array. This transmitted energy creates a flat field in space which can then be received in multiple receive lines, using bundled, parallel time delays.

1 Claim, 2 Drawing Figures

HIGH RESOLUTION MULTILINE ULTRASONIC BEAMFORMER

BACKGROUND OF THE INVENTION

The present invention relates to an apparatus used in medical ultrasound imaging. In particular, it relates to an apparatus which uses multiline beamforming.

The term "multiline beamforming" refers to a method of image reconstruction wherein multiple receive lines are used for each transmit line. The obvious advantage of multiline beamforming is the potential for obtaining high frame rates with a given line density. In particular, by reconstructing multiple, simultaneous receive lines for each transmit line, it is possible to obtain frame rates equivalent to the multiple of receive lines generated. For example, by reconstructing three simultaneous receive lines for each transmit line, frame rates of approximately 120 frames per second with 128 lines per scan at a range of 15 centimeters could be generated. This approximation is based upon a velocity of propagation of approximately 1.5 mm/$\mu$sec. Cardiac scans obtained at this speed and viewed at a lower rate could reveal details of motion which would aid in the diagnosis of certain clinical problems, such as valvular disease and septal defects.

Speckle reduction could be obtained at the same frame rate as is presently used. Averaging frames obtained under different conditions, such as aperture, frequency, and zone modulation, could be preformed, and the results could be displayed at different frame rates. Such averaging could improve image quality significantly. Also, it might be possible, at high frame rates, to view the motion of blood by following the speckle pattern produced by the scattering of red blood cells. Using this method, viewing would be performed on frames replayed at a slower frame rate than the rate at which they were obtained. Similarly, this method could be used to speed up the doppler flow imaging scan rates. Presently, it is necessary to slow the frame rate down to rates of 4 to 10 frames per second to acquire doppler data for a ninety degree sector. Multiline beamforming offers the potential for increasing this rate significantly.

While the idea of multiline beamforming has been around for some time, heretofore, there has been no practical way to implement a device employing multiline beamforming without degrading image quality.

During simulations performed previously to determine the effect on image quality of this method of imaging, it was discovered that image quality was degraded. It was postulated that the reason for the poor image quality was the narrow width of the transmit beam. Conventional methods of widening the beam, such as decreasing the transmit aperture and focusing at large distances resulted in loss of resolution with very little improvement in image texture.

Skipping transmit lines introduces artifact into the image. The larger the angular spacing between transmit lines, the more apparent the artifact will be. The increased artifact results from the decreased number of samples as a function of angle. Accordingly, the image, which contains special frequencies in excess of those which can be reproduced without artifact at the given sample rate, is undersampled. Such undersampling of the space domain signal, as a function of angle, introduces artifact in a manner similar to undersampling a time domain signal in time.

One way to limit the artifact would be to limit the spacial freqency content which can be processed. Unfortunately, the processing occurs in the array beam, and the only control of the array beam is via altering the acoustic beam. Widening the beam averages the spacial frequency content, so it would be expected to reduce artifact. Again, by analogy, widening the beam is equivalent to low pass filtering a time domain signal.

Assuming that reciprocity holds in the space domain, the effect of widening the transmit beam without altering the receive beam should be the same as the effect of widening the receive beam without altering the transmit beam. In practice, however, the effect has been found to be somewhat different if the receive beam is dynamically focused. Two relatively simple, but crude, methods of widening the transmit beam are to decrease the aperture on transmit and to move the focal point far out so that the beam is wider than where the aperture is focused at the desired image plane. In practice, moving the focus point out is quite limited due to the natural focusing qualities of a finite aperture transducer. It has been shown experimentally that both moving the focus point out and decreasing the aperture size are effective in reducing artifact. However, reducing the aperture has a more predominant effect on artifact and produces less resolution degradation. Reducing the aperture also reduces the penetration.

SUMMARY OF THE INVENTION

By generating a transmit beam optimized so as to give a flat response in space over the spacial angles associated with the corresponding multiple receive beams, the image quality is restored to the quality of the original image with no detectable loss in resolution. In view of the fact that an artifact free image is desired along a particular plane and the fact that merely skipping lines in the transmit mode fails to produce such an artifact free image, an examination of the space domain indicates that a mere line skipping approach fails to provide appropriate coverage in the transmit mode. The desired transmit coverage in a line skipping mode has been determined to require a pressure excitation at the array aperture equivalent to a normalized $\sin(\pi x)/\pi x$ function, where x represents the normalized horizontal distance along the array, measured from the center of the array. The use of the $\sin(\pi x)/\pi x$ function in the transmit mode has been found, when combined with a standard dynamic focused receive mode, to result in a multiline beamformer having a substantially reduced artifact, when compared to multiline beamformer using a standard transmit beam.

The method of generating the optimal flat beam profile is to excite the individual elements in the phase array with an excitation chosen to have an amplitude which varies along the array. In particular, the voltage applied to the array elements which generate the pressure is chosen to have the function $\sin(\pi x)/\pi x$. This requires a phase reversal on the outer elements of the array and amplitude weighting of all of the array elements. This method contrasts with conventional excitation methods which involve equal excitation of all elements.

In the receive mode, each array element has a delay associated with it corresponding to the time it takes a signal to travel from a point in space to that array element. Accordingly, each array element has associated with it a delay corresponding to each point in space along the image line.

In accordance with the present invention, the array elements are excited with a $\sin(\pi x)/\pi x$ weighting function and multiple receive lines are derived for each transmitted line. The multiple received lines result from a reconstruction of the receive signal after the various delays have been used to focus and steer the array.

DETAILED DESCRIPTION OF THE PREFERRED EMBODIMENT

Figure 1:
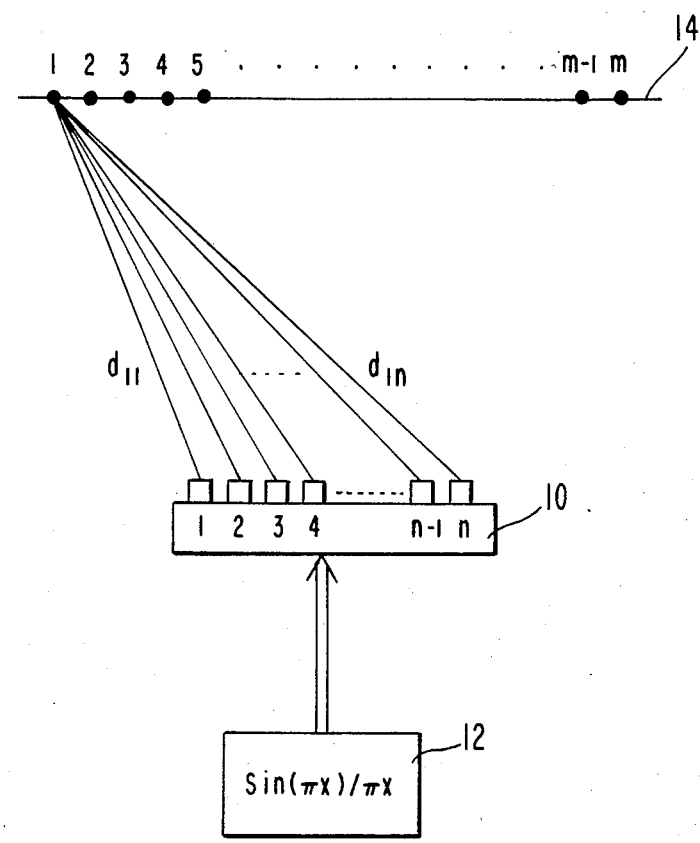
FIG. 1 is an illustration showing the focussing of a phased array transducer along an image line.

Referring now to FIG. 1, an n-element array 10 is shown. The array 10 is energized by a means for transmitting lines of ultrasound 12. The means 12 provides the array 10 with voltages at each element of the array 10 such that the array elements generate ultrasound pressures whose amplitudes correspond to the formula $\sin(\pi x)/\pi x$, where x is the normalized distance measured from the center of the array 10. In addition, a line in space 14 having a series of m points thereon is shown. The distance from point 1 on line 14 to array element 1 is illustrated by a distance $d_{11}$. Similarly, the distance from point m on line 14 to the elements 1 through n of the array 10 correspond to $d_{m1}$ through $d_{mn}$. In general, the distance from point i on line 14 to array element j corresponds to $d_{ij}$.

In order to focus the array 10 at a point k on line 14, time delays must be used with each array element. The purpose of the time delays is to insure that the signal which is processed by the electronics associated with each element of the array corresponds to the signal reflected by the point k in space at the same time. Accordingly, the time delay, $T_{ik}$, associated with each array element k corresponds to the difference in time it would take a signal from point i to reach the closest array element and the amount it would take for the signal from point i to reach array element k. Accordingly, for each point i on the line 14 there is a delay $T_{ik}$ for array element k.

Figure 2:
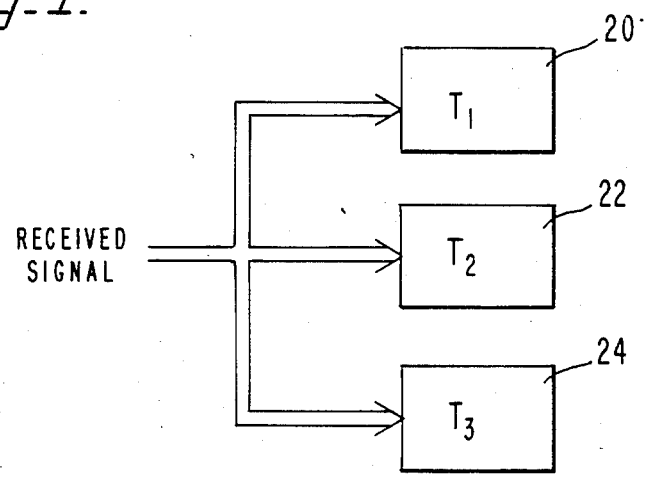
FIG. 2 is an illustration showing the delays used in the present invention when multiple receive lines are produced for each transmit line.

Referring generally to FIG. 2, the various time delays which are associated with each point on the line 14, i.e., to associated the various array elements k with the various points i, may be thought of, for the purpose of understanding the present invention, as being bundled together into time delays $T_i$, where each bundled time delay, $T_i$, includes appropriate array element delays, $T_{ik}$, of the type well known in the phase array art.

With reference to FIG. 2, three bundled time delays 20, 22, 24 are used in parallel to generate three receive lines for each transmitted line. In general, however, two or more such bundled time delays may be used to generate a multiple number of receive lines for each transmit line in the multiline beamformer of the present invention. The outputs of the bundled delays 20, 22, 24 are fed into the memory of a standard digital scan converter of the type well known in the ultrasound art.

I claim:

1. A multiline beamformer for use with a phased array ultrasound transducer comprising:
   (a) means for transmitting lines of ultrasound having pressures at the array aperture which correspond to the formula $\sin(\pi x)/\pi x$, where x is the normalized distance measured from the center of the array; and
   (b) a plurality of bundled delays for generating received ultrasound lines, the number of such delays corresponding to the multiple of received lines generated for each line transmitted.

* * * * *